(12) United States Patent
Bandara

(10) Patent No.: US 9,158,790 B2
(45) Date of Patent: Oct. 13, 2015

(54) SERVER, DICTIONARY CREATION METHOD, DICTIONARY CREATION PROGRAM, AND COMPUTER-READABLE RECORDING MEDIUM RECORDING THE PROGRAM

(75) Inventor: Udana Bandara, Shinagawa-ku (JP)

(73) Assignee: Rakuten, Inc., Tokyo (JP)

(*) Notice: Subject to any disclaimer, the term of this patent is extended or adjusted under 35 U.S.C. 154(b) by 965 days.

(21) Appl. No.: 13/379,969

(22) PCT Filed: Apr. 26, 2011

(86) PCT No.: PCT/JP2011/060187
§ 371 (c)(1),
(2), (4) Date: Dec. 21, 2011

(87) PCT Pub. No.: WO2012/077369
PCT Pub. Date: Jun. 14, 2012

(65) Prior Publication Data
US 2012/0143598 A1     Jun. 7, 2012

(30) Foreign Application Priority Data

Dec. 7, 2010     (JP) ................................ 2010-272790

(51) Int. Cl.
*G06F 17/21*     (2006.01)
*G06F 17/30*     (2006.01)
(Continued)

(52) U.S. Cl.
CPC ...... *G06F 17/30241* (2013.01); *G06F 17/2735* (2013.01); *G06Q 30/00* (2013.01)

(58) Field of Classification Search
CPC .......... G06F 2221/211; G06F 17/2735; G06Q 30/00; H04M 1/72572; H04M 2250/10
USPC .................... 715/700, 259; 704/10; 455/456.1
See application file for complete search history.

(56) References Cited

U.S. PATENT DOCUMENTS 6,442,479 B1     8/2002   Barton
8,185,132 B1 *   5/2012   Katpelly et al. ........... 455/456.1
(Continued)

FOREIGN PATENT DOCUMENTS

JP     11-15876 A     1/1999
JP     11-312168 A    11/1999
(Continued)

OTHER PUBLICATIONS

European Search Report issued Apr. 5, 2013 in corresponding European Patent Application No. 11788758.8.
(Continued)

*Primary Examiner* — Vijay B Chawan
*Assistant Examiner* — Mark Villena
(74) *Attorney, Agent, or Firm* — Sughrue Mion, PLLC

(57) ABSTRACT

A search server includes a category database that stores category information containing location information indicating a geographical location, a word assigned to the location, and a user ID identifying a user having assigned the word to the location in association with one another, and a dictionary registration unit that reads first input information indicating locations to which a first word is assigned by a first user and second input information indicating locations to which a second word is assigned by a second user, and when determining that the first and second users have assigned the words to a predetermined number or more of common locations based on those information, creates dictionary data containing the first and second words in association with each other and enters the dictionary data into a dictionary database.

10 Claims, 19 Drawing Sheets

(51) Int. Cl.
*G06F 17/27* (2006.01)
*G06Q 30/00* (2012.01)

(56) References Cited

U.S. PATENT DOCUMENTS

| 8,346,770 | B2 | 1/2013 | Smith et al. | |
|---|---|---|---|---|
| 2005/0278378 | A1* | 12/2005 | Frank | 707/104.1 |
| 2006/0230350 | A1* | 10/2006 | Baluja | 715/700 |
| 2008/0097966 | A1* | 4/2008 | Choi et al. | 707/3 |
| 2009/0070412 | A1* | 3/2009 | D'Angelo et al. | 709/203 |
| 2009/0171686 | A1* | 7/2009 | Eberstadt | 705/1 |
| 2009/0300716 | A1* | 12/2009 | Ahn | 726/1 |
| 2010/0004975 | A1* | 1/2010 | White et al. | 705/10 |
| 2010/0042318 | A1* | 2/2010 | Kaplan et al. | 701/204 |
| 2010/0169769 | A1* | 7/2010 | Jimenez et al. | 715/259 |
| 2011/0246442 | A1* | 10/2011 | Bartell | 707/709 |

FOREIGN PATENT DOCUMENTS

| JP | 2002-73672 | A | 3/2002 |
|---|---|---|---|
| JP | 2004240703 | A | 8/2004 |
| JP | 2007-148948 | A | 6/2007 |
| JP | 2007-158815 | A | 6/2007 |
| JP | 2008-90802 | A | 4/2008 |
| JP | 2009-169470 | A | 7/2009 |
| JP | 2010-39381 | A | 2/2010 |
| JP | 2010038778 | A | 2/2010 |
| JP | 2010-133904 | A | 6/2010 |
| JP | 2010-231526 | A | 10/2010 |
| KR | 10-2006-0095979 | A | 9/2006 |

OTHER PUBLICATIONS

Gray J et al: "Transaction Processing. Concepts and Techniques", Transaction Processing: Concepts and Techniques, (Jan. 1, 1993), pp. 1-43.

International Preliminary Report on Patentability dated Jun. 20, 2013 issued in International Application No. PCT/JP2011/060187.

Notice of Allowance issued by the Korean Patent Office in Korean Application No. 10-2011-7030656 dated Jan. 28, 2013.

Office Action issued by the Chinese Patent and Trademark Office in counterpart Application No. 201180002557.3 dated Jan. 6, 2014.

* cited by examiner

Fig.7

| FACILITY ID | FACILITY-RELATED INFORMATION | | | CATEGORY LIST |
| --- | --- | --- | --- | --- |
| | FACILITY NAME | LOCATION ADDRESS (MAP INFORMATION) | ... | |
| 1001 | STORE a | ... | ... | CAFE<br>TEA<br>STUDY PLACE |
| 1002 | STORE b | ... | ... | CAFE<br>TEA |
| 1003 | STORE c | ... | ... | CAFE<br>STUDY PLACE |
| 1004 | STORE d | ... | ... | TEA |
| 1005 | STORE e | ... | ... | TEA |
| 1006 | STORE f | ... | ... | STUDY PLACE |
| 1007 | STORE g | ... | ... | STUDY PLACE |
| ... | ... | ... | ... | ... |

Fig.8

| USER ID | LOCATION INFORMATION | CATEGORY NAME |
|---|---|---|
| USER A | (x11,y11) | CAFE |
| | (x12,y12) | DEPARTMENT STORE |
| | (x13,y13) | BOOKSTORE |
| | (x14,y14) | CAFE |
| | (x15,y15) | CAFE |
| | (x16,y16) | DEPARTMENT STORE |
| | (x17,y17) | DEPARTMENT STORE |
| | ... | ... |
| USER B | (x21,y21) | MAGAZINE |
| | (x22,y22) | TEA |
| | (x23,y23) | MAGAZINE |
| | (x24,y24) | MAGAZINE |
| | (x25,y25) | TEA |
| | (x26,y26) | TEA |
| | (x27,y27) | TEA |
| | ... | ... |
| USER C | (x31,y31) | STUDY PLACE |
| | (x32,y32) | STUDY PLACE |
| | (x33,y33) | SHOP |
| | (x34,y34) | STUDY PLACE |
| | (x35,y35) | STUDY PLACE |
| | (x36,y36) | SHOP |
| | (x37,y37) | SHOP |
| | ... | ... |
| ... | ... | ... |

| DICTIONARY DATA |
|---|
| CAFE,TEA,STUDY PLACE |
| DEPARTMENT STORE,SHOP |
| ... |

(b)

| DICTIONARY DATA |
|---|
| CAFE,TEA |
| CAFE,STUDY PLACE |
| DEPARTMENT STORE,SHOP |
| ... |

*Fig.16*

| USER ID 1 | USER ID 2 | RELATIONSHIP |
|---|---|---|
| USER A | USER B | ORDINARY FRIEND RELATIONSHIP |
| USER B | USER C | LIKE-MINDED COLLEAGUES |
| ... | ... | ... |

Fig.17

| FACILITY ID | FACILITY-RELATED INFORMATION | | ... | CATEGORY LIST | PRIVACY SETTINGS LIST (REGISTRATION USER, PRIVACY SETTINGS) |
|---|---|---|---|---|---|
| | FACILITY NAME | LOCATION ADDRESS (MAP INFORMATION) | | | |
| 1001 | STORE a | ... | ... | CAFE<br>TEA<br>STUDY PLACE | (USER A, FRIENDS ONLY)<br>(USER B, EVERYONE)<br>(USER C, LIKE-MINDED COLLEAGUES) |
| 1002 | STORE b | ... | ... | CAFE<br>TEA | (USER A, FRIENDS ONLY)<br>(USER B, FRIENDS ONLY) |
| 1003 | STORE c | ... | ... | CAFE<br>STUDY PLACE | (USER A, EVERYONE)<br>(USER C, LIKE-MINDED COLLEAGUES) |
| 1004 | STORE d | ... | ... | TEA | (USER B, EVERYONE) |
| 1005 | STORE e | ... | ... | TEA | (USER B, FRIENDS ONLY) |
| 1006 | STORE f | ... | ... | STUDY PLACE | (USER C, LIKE-MINDED COLLEAGUES) |
| 1007 | STORE g | ... | ... | STUDY PLACE | (USER C, LIKE-MINDED COLLEAGUES) |
| ... | ... | ... | ... | ... | ... |

SERVER, DICTIONARY CREATION METHOD, DICTIONARY CREATION PROGRAM, AND COMPUTER-READABLE RECORDING MEDIUM RECORDING THE PROGRAM

CROSS REFERENCE TO RELATED APPLICATIONS

This is a National Stage of International Application No. PCT/JP2011/060187 filed Apr. 26, 2011, claiming priority based on Japanese Patent Application No. 2010-272790 filed Dec. 7, 2010, the contents of all of which are incorporated herein by reference in their entirety.

TECHNICAL FIELD

One embodiment of the present invention relates to a server, a method and a program for creating a dictionary for information search, and a computer-readable recording medium recording the program.

BACKGROUND ART

An information processing system that searches for information matching given criteria and provides the information to a user is hitherto known. For example, a preference information management system that estimates and uses preference information suitable for a user is disclosed in Patent Literature 1 listed below. The system includes a means for estimating preference information based on the current location and a category of its place when there is no preference information in a certain location, and a means for storing correspondence between absolute location data as represented by latitude and longitude and a category of its place.

Further, a service information delivery device that allows a recipient of service information to easily obtain service information related to the current location is disclosed in Patent Literature 2 listed below. Upon receiving a service delivery request from a terminal of a recipient member, the device automatically acquires the current location information of the terminal, extracts service information matching the service genre desired by the member and also matching the current location information from a delivery file, and delivers the service information to the terminal.

Furthermore, a destination search device for easily conducting a search for a destination even when the name or location of the destination is unknown is disclosed in Patent Literature 3 listed below. The device searches for a destination based on a database storing names, locations and genres of places which can be a destination or relevant place, a selected genre, an input name or genre of a relevant place, and a specified positional relationship.

In such search systems, "Fuzzy" search or "Did you mean" search using a dictionary which defines relations of characters or words is used in some cases. This search technique may be used to estimate a correct word and runs a search when there is a typing error in search criteria. Further, it may be used to estimate another word related to a word input as search criteria and runs a search using the estimated word as well, thereby extending the range of search results.

As a technique relating to a dictionary to implement such a search, a synonym computation device that creates a synonym dictionary reflecting the degree of association of at least two types is disclosed in Patent Literature 4 listed below. The device uses at least two types of degree-of-association dictionaries, and initializes a word group based on one degree-of-association dictionary and merges word groups based on the respective degree-of-association dictionaries, thereby creating a synonym group.

CITATION LIST

Patent Literature

PTL 1: Japanese Unexamined Patent Application Publication No. H11-15876
PTL 2: Japanese Unexamined Patent Application Publication No. 2002-73672
PTL 3: Japanese Unexamined Patent Application Publication No. 2010-133904
PTL 4: Japanese Unexamined Patent Application Publication No. H11-312168

SUMMARY OF INVENTION

Technical Problem

However, the dictionary disclosed in the above Patent Literature 4 is created on the system side, and a user cannot take part therein. If the thought or behavior of a user can be reflected on the related term dictionary, there is a chance of achieving an information service in a novel way.

In light of the foregoing, it is desirable to create a related term dictionary with user's thought or behavior taken into consideration.

Solution to Problem

A server according to one embodiment of the present invention includes an input storage means for storing input information containing location information indicating a geographical location, a word assigned to the location, and a user ID identifying a user having assigned the word to the location, the location information, the word, and the user ID being in association with one another; a determination means for reading out first input information indicating locations to which a first word is assigned by a first user and second input information indicating locations to which a second word is assigned by a second user from the input storage means, and determining whether the first and second users have assigned the words to a predetermined number or more of common locations based on the first and second input information; and a registration means for creating dictionary data containing the first and second words in association with each other and entering the dictionary data into a dictionary storage means when the determination means determines that the first and second users have assigned the words to a predetermined number or more of common locations.

A dictionary creation method according to one embodiment of the present invention includes a determination steps of reading out first input information indicating locations to which a first word is assigned by a first user and second input information indicating locations to which a second word is assigned by a second user from an input storage means for storing input information containing location information indicating a geographical location, a word assigned to the location, and a user ID identifying a user having assigned the word to the location, and determining whether the first and second users have assigned the words to a predetermined number or more of common locations based on the first and second input information, the location information, the word, and the user ID being in association with one another; and a registration step of creating dictionary data containing the first and second words in association with each other and entering the dictionary data into a dictionary storage means when the determination step determines that the first and second users have assigned the words to a predetermined number or more of common locations.

A dictionary creation program according to one embodiment of the present invention causes a computer to function as an input storage means for storing input information containing location information indicating a geographical location, a word assigned to the location, and a user ID identifying a user having assigned the word to the location, the location information, the word, and the user ID being in association with one another; a determination means for reading out first input information indicating locations to which a first word is assigned by a first user and second input information indicating locations to which a second word is assigned by a second user from the input storage means, and determining whether the first and second users have assigned the words to a predetermined number or more of common locations based on the first and second input information; and a registration means for creating dictionary data containing the first and second words in association with each other and entering the dictionary data into a dictionary storage means when the determination means determines that the first and second users have assigned the words to a predetermined number or more of common locations.

A computer-readable recording medium according to one embodiment of the present invention stores a dictionary creation program causing a computer to function as an input storage means for storing input information containing location information indicating a geographical location, a word assigned to the location, and a user ID identifying a user having assigned the word to the location, the location information, the word, and the user ID being in association with one another; a determination means for reading out first input information indicating locations to which a first word is assigned by a first user and second input information indicating locations to which a second word is assigned by a second user from the input storage means, and determining whether the first and second users have assigned the words to a predetermined number or more of common locations based on the first and second input information; and a registration means for creating dictionary data containing the first and second words in association with each other and entering the dictionary data into a dictionary storage means when the determination means determines that the first and second users have assigned the words to a predetermined number or more of common locations.

According to the embodiment, it is determined whether two users have assigned words to a predetermined number or more of common locations based on the input information. When the words have been assigned to a predetermined number or more of common locations, the two words assigned to the common location by the respective users are associated with each other, and entered as dictionary data. Because assigning a word to a certain location can be regarded as an indication of the thought or act of a user, the input information is a kind of information indicating the thought or act of a user. Therefore, by establishing an association between words in consideration of the overlap of locations to which the words are assigned using such input information, it is possible to create a related term dictionary with the user's thought or behavior taken into consideration.

In a server according to another embodiment, when the dictionary data containing the first word and the second word in association with each other are stored in the dictionary storage means and further the determination means determines, based on the second input information and third input information indicating locations to which a third word is assigned by a third user, that the second and third users have assigned the words to a predetermined number or more of common locations, the registration means may create dictionary data containing the first to third words in association with one another and enter the dictionary data into the dictionary storage means.

In this case, two words which are associated indirectly through one given word are also associated directly, thus allowing an increase in the variety of patterns of associations between words.

In a server according to yet another embodiment, when the dictionary data containing the first word and the second word in association with each other is stored in the dictionary storage means and further the determination means determines, based on the second input information and third input information indicating locations to which a third word is assigned by a third user, that the second and third users have assigned the words to a predetermined number or more of common locations, the registration means may create dictionary data containing the second and third words in association with each other without associating the first and third words each other, and enter the dictionary data into the dictionary storage means.

In this case, an association between words is established in consideration only of the overlap of locations to which the words are assigned, thus allowing creation of a dictionary in which behavior patterns of two users are reflected as they are.

In a server according to yet another embodiment, the location information may be information representing the geographical location by at least latitude and longitude, and, when a location indicated by one of the input information and a location indicated by another one of the input information are within a predetermined geographical range, the determination means may determine the both locations to be common.

In this case, even if locations to which words are assigned are slightly different between users, they are treated as a common location. It is thereby possible to appropriately determine the overlap of locations to which words are assigned even when the location information is represented by exact values of the latitude and longitude.

In a server according to yet another embodiment, the location information may be information representing the geographical location by the latitude and longitude, and an altitude, and the predetermined geographical range may be a range represented in a three-dimensional form.

In this case, the location information and the geographical range for determining the overlap of locations are represented in a three-dimensional manner, and it is thereby possible to appropriately determine the overlap of locations to which words are assigned even when the location information is represented by exact values of the latitude, longitude and altitude.

A server according to yet another embodiment may further include a facility storage means for storing facility information containing a facility ID identifying a facility and a category name assigned to the facility by a user in association with each other; a receiving means for receiving a request signal containing a specified category name input by a user from a terminal of the user; a search means for reading facility information corresponding to the request signal received by the receiving means from the facility storage means; and a transmitting means for transmitting the facility information read by the search means to the terminal, and the word may be a category name assigned to a facility located in a predetermined location, and the search means may read another category name associated with the specified category name from the dictionary storage means and read facility information corresponding to the specified category name or another category name from the facility storage means.

In this case, not only a category name specified by the user's terminal but also another category name associated with the category name are used when searching for the facility information. Then, the facility information corresponding to the specified category name or the related category name is extracted and transmitted to the terminal. The user can thereby obtain not only information about facilities to which the category is assigned by the user but also facilities to which the category is assigned by others and which are likely to be related to the specified category. This enhances the convenience of facility search.

A server according to yet another embodiment may further include a user relationship storage means indicating a relationship between users, and the facility information may further contain information indicating privacy settings of the facility information based on a relationship between users assigned by a user, the receiving means may receive the request signal further containing a user ID identifying a user of the terminal, and the search means may read facility information corresponding to the specified category name or another category name and in which the user identified by the user ID contained in the request signal is within boundaries of the privacy settings by reference to the facility storage means and the user relationship storage means.

In this case, the facility information is extracted in consideration not only of matching with the category name but also of the availability of the information based on a relationship between users. It is thereby possible to provide search results reflecting a connection between users to the user.

In a server according to yet another embodiment, when the search means reads facility information containing another category name and not containing the specified category name, the search means may temporarily associate the specified category name with the facility information for processing in the terminal.

In this case, the specified category name is associated with all of the extracted facility information, thereby facilitating processing concerning the category names performed in the terminal.

Advantageous Effects of Invention

According to one aspect of the present invention, dictionary data are created by establishing an association between words in consideration of the overlap of locations to which users have assigned the words, and it is thereby possible to create a related term dictionary with the user's thought or behavior taken into consideration.

BRIEF DESCRIPTION OF DRAWINGS

FIG. 7 is a view showing an example of facility information according to the first embodiment.

FIG. 8 is a view showing an example of category information.

FIG. 10(a)(b) are views showing examples of dictionary data.

FIG. 16 is a view showing an example of user relationship information.

FIG. 17 is a view showing an example of facility information according to the second embodiment.

DESCRIPTION OF EMBODIMENTS

Hereinafter, preferred embodiments of the present invention are described in detail with reference to the appended drawings. In the embodiments, a server according to the present invention is applied to a search server. It is noted that, in the description of the drawings, the same or similar elements will be denoted by the same reference symbols, and the redundant description thereof will be omitted.

First Embodiment

The functions and configuration of a search server 10 according to a first embodiment are described hereinafter with reference to FIGS. 1 to 10. The search server 10 is a computer system that, in response to a request from a mobile terminal T owned by a user, transmits information about facilities (facility information) to the terminal T. Note that examples of facilities include stores, hotels, sightseeing spots, public facilities and the like, though the variety of facilities is not limited thereto. The mobile terminal T displays the received facility information in groups by the categories of facilities, and the categories are assigned in advance to the user. The search server 10 transmits not only facility information matching the category assigned by the user who has requested facility information but also facility information matching another category related to the category. For this reason, the search server 10 includes a database (dictionary database 16 described later) of a dictionary (related term dictionary) in which associations between categories are defined, and the dictionary is created using information transmitted from the mobile terminal T.

Figure 1:
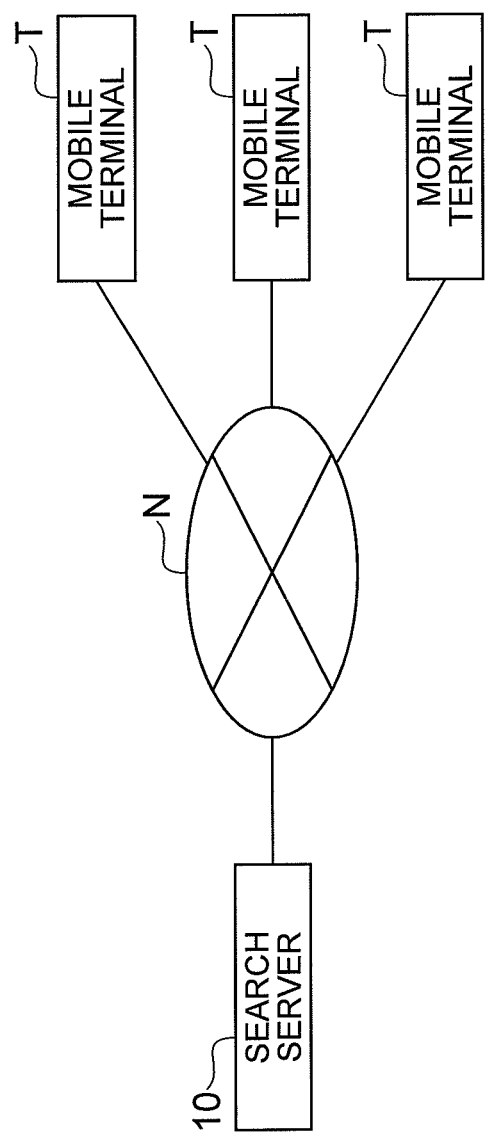
FIG. 1 is a view showing an overall configuration of a system including a search server according to a first embodiment.

As shown in FIG. 1, the search server 10 is connected with a plurality of mobile terminals T through a communication network N. Note that, although three mobile terminals T are shown in FIG. 1, any number of mobile terminals T may be connected. Examples of the mobile terminal T include advanced mobile phones (smartphones) and personal digital assistances (PDAs), though the variety of terminals is not limited thereto.

Before specifically describing the functional configuration of the search server 10, a screen which is displayed on the mobile terminal T that cooperates with the search server 10 is described to facilitate understanding.

Figure 2:
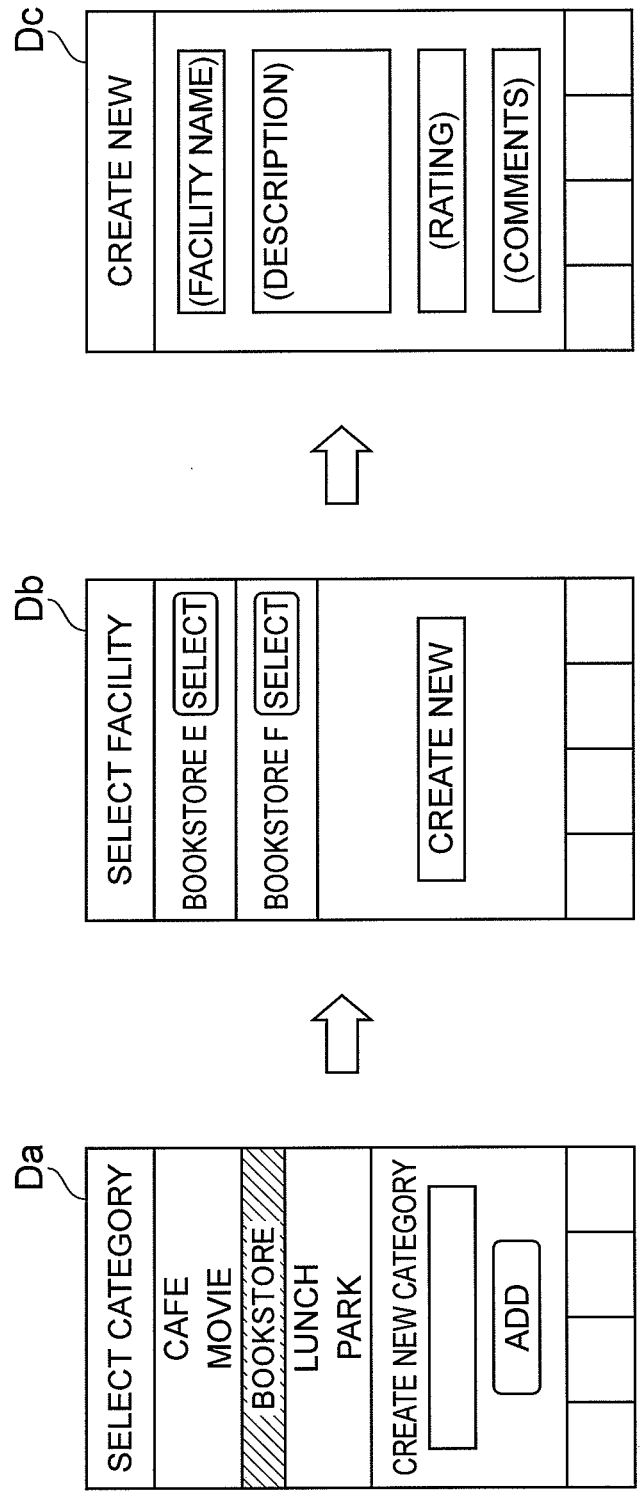
FIG. 2 is a view showing an example of screens for category assignment displayed on the mobile terminal shown in FIG. 1.

FIG. 2 is a view showing an example of screens for inputting information to serve as the basis for dictionary data. A word to be entered into the dictionary in this embodiment is the name of a category (category name) for classifying facilities. The category name is a word which is uniquely assigned to each facility by a user. A user assigns a category name to the facility in which the user is interested through the screens as shown in FIG. 2.

First, a user selects a category name on a screen Da. The user may select one category from a list of categories (movie, bookstore, lunch etc.) already registered by the user or create a new category by inputting a category not on the list and pressing "Add" button. In the example of FIG. 2, the category "bookstore" is selected.

Then, the user selects a facility on a screen Db. The user may select a facility from the list of facilities (bookstores E and F) located nearby. The mobile terminal T incorporates a GPS function, and transmits a list request signal containing location information indicating the current location of its own terminal obtained by the function to the search server 10. After that, the mobile terminal T receives a list of facility information (candidate facility list) which is transmitted from the search server 10 in response to the signal, and displays the list on the screen Db. Further, the user may display a screen Dc by pressing "Create New" button on the screen Db and input information of a facility not on the list.

When the user completes an operation to assign categories to facilities, the mobile terminal T generates input information based on the operation and transmits it to the search server 10. In the case where a facility is selected from the list, the input information contains the user ID uniquely identifying the user, the location information representing the current location of the mobile terminal T by latitude and longitude, the facility ID of the facility selected by the user, and the category name input for the facility by the user. In the case where a facility is newly input by the user, the input information contains the user ID, the location information, the facility information and the category name input by the user.

Figure 3:
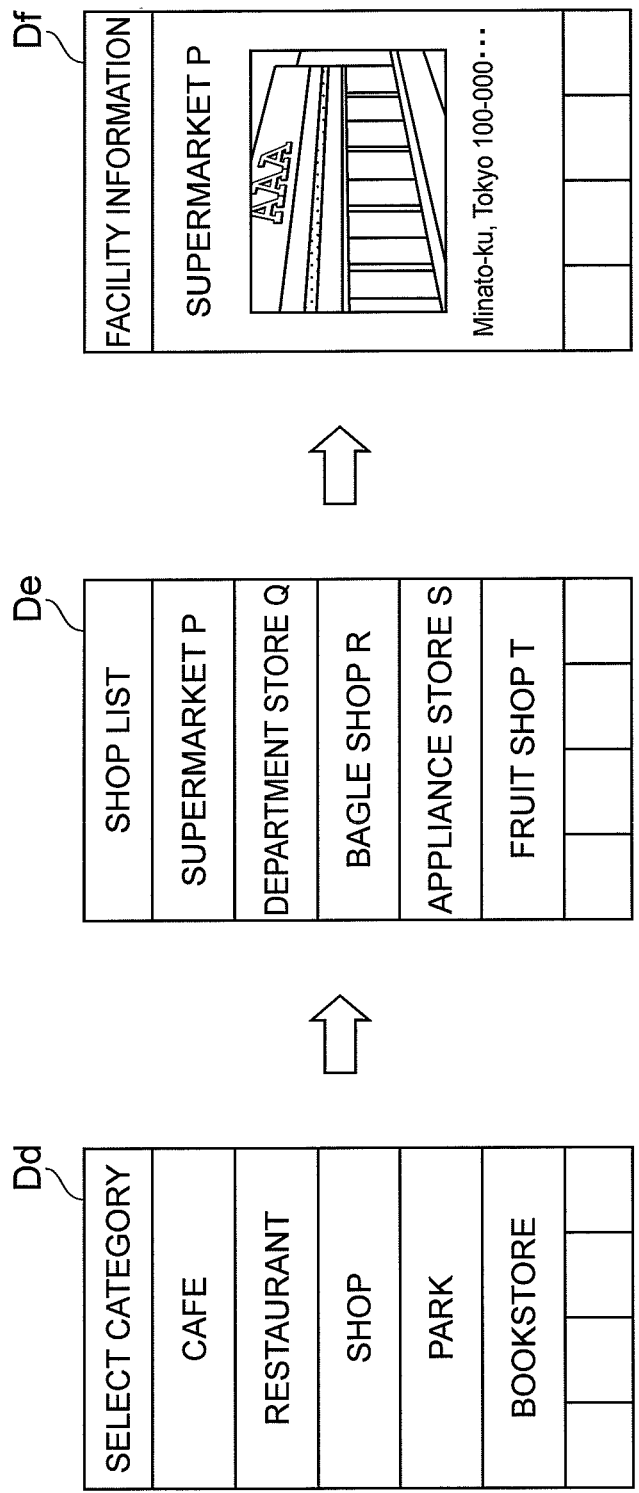
FIG. 3 is a view showing an example of a facility display screen displayed on the mobile terminal shown in FIG. 1.

FIG. 3 is a view showing an example of a screen displaying facility information in response to a user request. When the user opens a screen Dd for conducting a facility search, the list of category names entered by the user and stored in the mobile terminal T is displayed. When the user selects one category on the screen Dd, the mobile terminal T generates a request signal containing the selected category name (specified category name) and the location information representing the current location of the mobile terminal T by latitude and longitude and transmits the request signal to the search server 10. After that, the mobile terminal T receives the facility information transmitted from the search server 10 in response to the signal, and displays the received information as a list of categories (screen De). In the example of FIG. 3, the category name "shop" is selected, and facilities belonging to the category are displayed. When the user selects one facility on the screen De, the mobile terminal T displays detailed information of the facility (screen Df).

Figure 4:
FIG. 4 is a view showing details of the screen shown in FIG. 3.

The detailed layout of the screen Df is as shown in FIG. 4. At the uppermost part of the screen, the category name of the facility assigned by the user of the mobile terminal T and its rank indicated by stars are displayed. At the center of the screen, the photograph, name, address, telephone number and website URL of the facility are displayed. "Official" mark on the right of the URL indicates that the URL is an official web page (i.e. a web page officially approved by the facility). At the lower part of the screen, comments of each user and the posted date are displayed.

Figure 5:
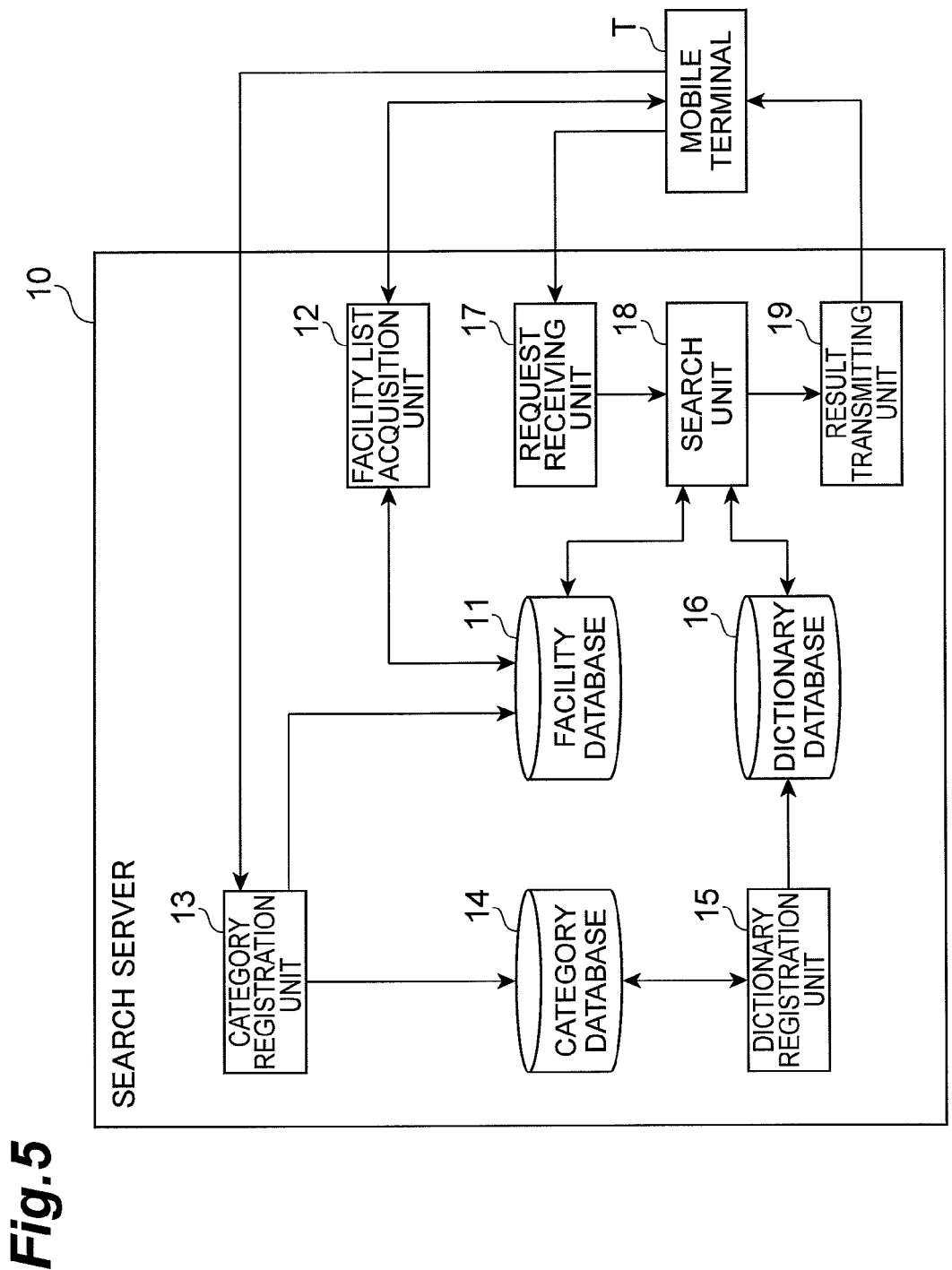
FIG. 5 is a block diagram showing a functional configuration of the search server shown in FIG. 1.

Next, the functional configuration of the search server 10 is described specifically. As shown in FIG. 5, the search server 10 includes a facility database (facility storage means) 11, a facility list acquisition unit 12, a category registration unit 13, a category database (input storage means) 14, a dictionary registration unit (determination means, registration means) 15, a dictionary database (dictionary storage means) 16, a request receiving unit (receiving means) 17, a search unit (search means) 18, and a result transmitting unit (transmitting means) 19 as functional components.

Figure 6:
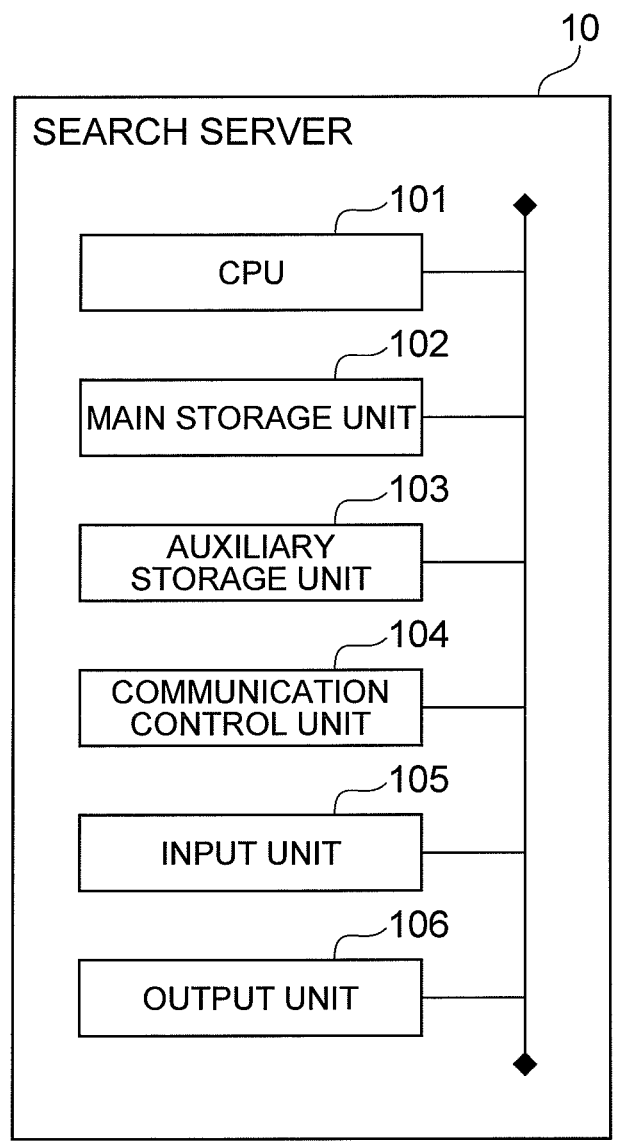
FIG. 6 is a view showing a hardware configuration of the search server shown in FIG. 1.

The search server 10 is composed of a CPU 101 that executes an operating system, an application program and the like, a main storage unit 102 composed of ROM and RAM, an auxiliary storage unit 103 composed of a hard disk and the like, a communication control unit 104 composed of a network card and the like, an input unit 105 such as a keyboard and a mouse, and an output unit 106 such as a monitor as shown in FIG. 6. The functions of the search server 10 are implemented by loading given computer software into the CPU 101 or the main storage unit 102, making the communication control unit 104, the input unit 105, the output unit 106 and the like operate under control of the CPU 101, and performing reading and writing of data in the main storage unit 102 or the auxiliary storage unit 103. The data and database required for processing are stored in the main storage unit 102 or the auxiliary storage unit 103.

Note that, although the search server 10 is composed of one computer in FIG. 6, the functions of the search server 10 may be distributed among a plurality of computers. For example, the search server 10 may be composed of a computer including the databases shown in FIG. 5 and a computer including the other functions.

Referring back to FIG. 5, the facility database 11 is a means for storing facility information about facilities. As shown in FIG. 7, the facility information is made up of a facility ID uniquely identifying a facility, facility-related information such as a facility name and location (map information) and comments of each user about the facility, and a list of category names (category list) assigned to the facility. The category names are added to the category list by the category registration unit 13, which is described later. Because there is a case where a plurality of users assign categories to one facility, one or more category names can be contained in the category list.

The facility list acquisition unit 12 is a means for extracting the facility information of facilities located in the vicinity of the mobile terminal T as a candidate facility list based on the list request signal received from the mobile terminal T. The facility list acquisition unit 12 extracts the location information indicating the current location of the mobile terminal T from the list request signal, compares the location information with the location (map information) indicated by each facility information in the facility database 11, and identifies the facilities located within a predetermined range from the current location of the mobile terminal T. Note that the range to search for facilities may be set arbitrarily (e.g. within a circle of 500 meters radius etc.). The facility list acquisition unit 12 reads the facility information of the one or more identified facilities from the facility database 11 and transmits them as the candidate facility list to the mobile terminal T. The list is displayed on the screen Db as described above.

Note that the facility list acquisition unit 12 may identify the facilities located within a search range which is input by a user. In this case, information indicating the search range is contained in the list request signal, and the facility list acquisition unit 12 identifies the facilities within the range.

The category registration unit 13 is a means for receiving input information transmitted from the mobile terminal T and updating the facility database 11 and the category database 14 based on the input information. Specifically, the category registration unit 13 executes processing of adding a category name to the category list of the facility information identified by the facility ID and processing of assigning a new facility ID to the facility information (including a category name) input in the mobile terminal T and entering the information on the facility database 11. Further, the category registration unit 13 generates category information by assigning the received user ID, location information and category name with one another, and enters the category information into the category database 14. The category information, which is a part of the input information, is information indicating a category name assigned to a geographical location (location where a facility is located) by a user.

The category database 14 is a means for storing the category information. Because the input information to serve as the basis for the category information is occasionally transmitted from each mobile terminal T to the search server 10, the category information is accumulated in the category database 14 as shown in FIG. 8, for example.

The dictionary registration unit 15 is a means for creating dictionary data by associating different category names assigned by different users, and storing the dictionary data into the dictionary database 16.

First, the dictionary registration unit 15 reads category information (first category information) indicating locations to which one category name (first category name) is assigned by one user (first user) and category information (second category information) indicating locations to which one category name (second category name) is assigned by another user (second user) from the category database 14.

Next, based on the first and second category information, the dictionary registration unit 15 determines whether the two users have assigned category names to a predetermined number or more of common locations. However, because the location indicated by the category information is the latitude and longitude, even if a plurality of users assign category names to one facility, the location information in the category information corresponding to them are different from each other in most cases. Therefore, when a plurality of locations indicated by the respective location information are within a predetermined geographical range (e.g. within a circle of several tens of meters radius etc.), the dictionary registration unit 15 determines that those locations are common. The dictionary registration unit 15 calculates in how many places the category assignment locations of the first and second users are common based on the first and second category information, and determines whether the calculated value is equal to or more than a predetermined number. A threshold to be used for the determination may be 2 or 3, for example, though other values may be also used.

When the number of common locations is less than the predetermined number, the dictionary registration unit 15 ends the process for the read first and second category information. On the other hand, when the number of common locations is equal to or more than the predetermined number, the dictionary registration unit 15 creates a dictionary data by establishing an association between the first category name and the second category name, and enters the dictionary data into the dictionary database 16.

The dictionary registration unit 15 executes the above-described series of processes for each category name of each user, thereby building the dictionary database 16.

Processing of the dictionary registration unit 15 is described with reference to FIGS. 9 and 10. Each mark shown on the map M of FIG. 9 corresponds to the category information shown in FIG. 8, and a dashed-line circle indicates a geographical range which is regarded as a common location. The threshold is assumed to be 2. Hereinafter, category information about a given category name of a given user ID is referred to in the format of "(user ID, category name)".

As to the combination of (user A, cafe) and (user B, tea), there are two common locations, and therefore the dictionary registration unit 15 creates dictionary data in which the two category names "cafe" and "tea" are associated with each other. Next, as to the combination of (user A, cafe) and (user B, magazine), there is no common location, and therefore the dictionary registration unit 15 does not establish an association between "cafe" and "magazine". There is also no common location for any of the combination of (user A, department store) and (user B, tea), the combination of (user A, department store) and (user B, magazine), and the combination of (user A, bookstore) and (user B, tea), and the dictionary registration unit 15 does not create dictionary data. Further, as to the combination of (user A, bookstore) and (user B, magazine), there is only one common location, and therefore the registration unit does not create dictionary data.

After performing such processing for each of between the users A and C and between the users B and C in the same manner, the dictionary registration unit 15 further establish an association between "cafe" and "study place" and between "department store" and "shop". As a result of the above processing, two sets of dictionary data shown in FIG. 10 are created in the dictionary database 16. In the case where two category names can be associated indirectly through one category name, the dictionary registration unit 15 may create dictionary data by any of the following ways.

In the above example, two category names "tea" and "study place" are associated indirectly through "cafe", and the dictionary registration unit 15 may create dictionary data in which those three category names are associated with one another (cf. FIG. 10(a)). In this case, two category names which are associated indirectly through one given category name are associated directly, thus allowing an increase in the variety of patterns of associations between categories.

Further, the dictionary registration unit 15 may create dictionary data composed of "cafe" and "tea" and dictionary data composed of "cafe" and "study place" separately without associating "tea" and "study place", by taking only the overlap of locations to which words are assigned into consideration (cf. FIG. 10(b)). In this case, associations are established in consideration only of the overlap of locations to which category names are assigned, thus allowing creation of a dictionary in which behavior patterns of two users are reflected as they are.

Referring back to FIG. 5, the request receiving unit 17 is a means for receiving a request signal indicating a request for facility information to be displayed on the screen De, Df from the mobile terminal T. The request receiving unit 17 outputs the received request signal to the search unit 18.

The search unit 18 is a means for retrieving facility information corresponding to the input request signal from the facility database 11. First, the search unit 18 extracts a specified category name and location information from the request signal. Next, the search unit 18 extracts another category name (which is referred to hereinafter as a "related category name") associated with the specified category name from the dictionary database 16. Assuming FIG. 10, the search unit 18 extracts "tea" and "study place" which are associated with the specified category name "cafe" or extracts "department store" which is associated with the specified category name "shop", for example.

Then, the search unit 18 reads facility information of facilities which contain the specified category name or the related category name and located within a predetermined geographical range from the current location of the mobile terminal T indicated by the location information from the facility database 11. Note that the search range for facilities may be set arbitrarily (e.g. within a circle of 500 meters radius etc.). The search unit 18 outputs the extracted facility information to the result transmitting unit 19. At the time of output, the search unit 18 temporarily associates the specified category name with the facility information which contains only the related category name. This is because the mobile terminal T to which the facility information is transmitted cannot recognize the related category assigned in another mobile terminal T. Establishing such an association facilitates the processing on the category names performed in the mobile terminal T. For example, at the time of displaying information of a facility to which a user does not assign a category name on the screen Df, the specified category name ("shop" in the example of FIG. 4) can be displayed at the upper left of the screen. Further, a user of the mobile terminal T can view the facility information based just on the category names assigned by him/herself.

Figure 9:
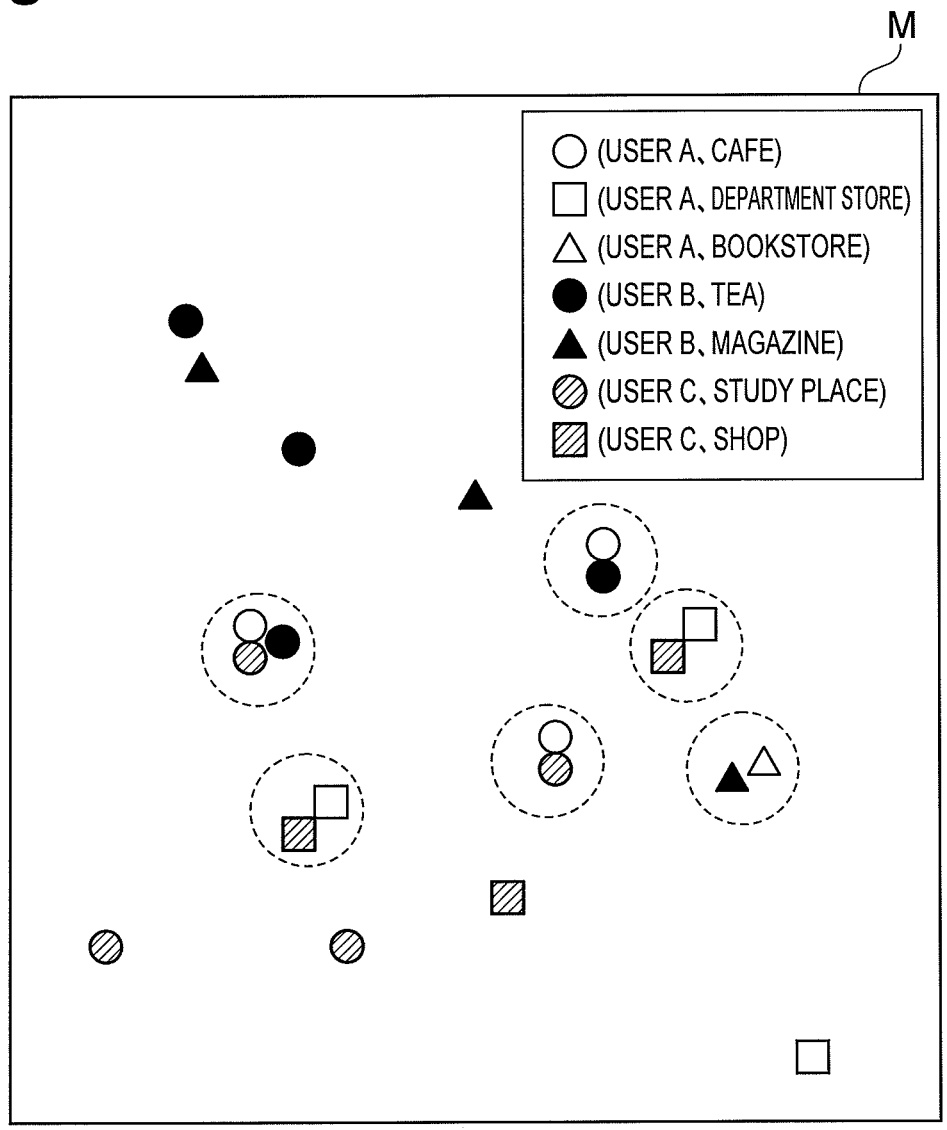
FIG. 9 is a view to explain a dictionary creation method according to the first embodiment.

Processing of the search unit 18 is described by way of illustration with reference to FIGS. 9 and 10. First, processing to search for the facilities in the map M corresponding to the category name "cafe" is described. When the dictionary data are prepared as shown in FIG. 10(*a*), the search unit 18 extracts not only the three stores to which "cafe" is assigned but also the four stores to which the specified category name "cafe" is not assigned but the related category name "tea" or "study place" is assigned, thereby retrieving those seven stores as search results. The results are the same when the dictionary data are prepared as shown in FIG. 10(*b*).

Next, processing to search for the facilities in the map M corresponding to the category name "tea" is described. When the dictionary data are prepared as shown in FIG. 10(*a*), the search unit 18 extracts not only the four stores to which "tea" is assigned but also the three stores to which the specified category name "tea" is not assigned but the related category name "cafe" or "study place" is assigned, thereby retrieving those seven stores as search results. On the other hand, when the dictionary data are prepared as shown in FIG. 10(*b*), the search unit 18 extracts the four stores to which "tea" is assigned and the one store to which the specified category name "tea" is not assigned but the related category name "cafe" is assigned, thereby retrieving those five stores as search results.

Note that the search unit 18 may extract information of the facilities located within a search range which is input by a user. In this case, information indicating the search range is contained in the request signal, and the search unit 18 extracts the facilities within the range.

The result transmitting unit 19 is a means for transmitting the facility information input from the search unit 18 as search results to the mobile terminal T from which the request signal is transmitted. The mobile terminal T displays the screen De, Df using the facility information.

Hereinafter, an operation of the search server 10 is described and further a dictionary creation method according to the embodiment is described with reference to FIGS. 11 and 12. The following description is based on the assumption that a certain number or more of category information are stored in the category database 14 based on the input information received from each mobile terminal T, and category names are assigned to a certain number or more of facility information in the facility database 11.

Figure 11:
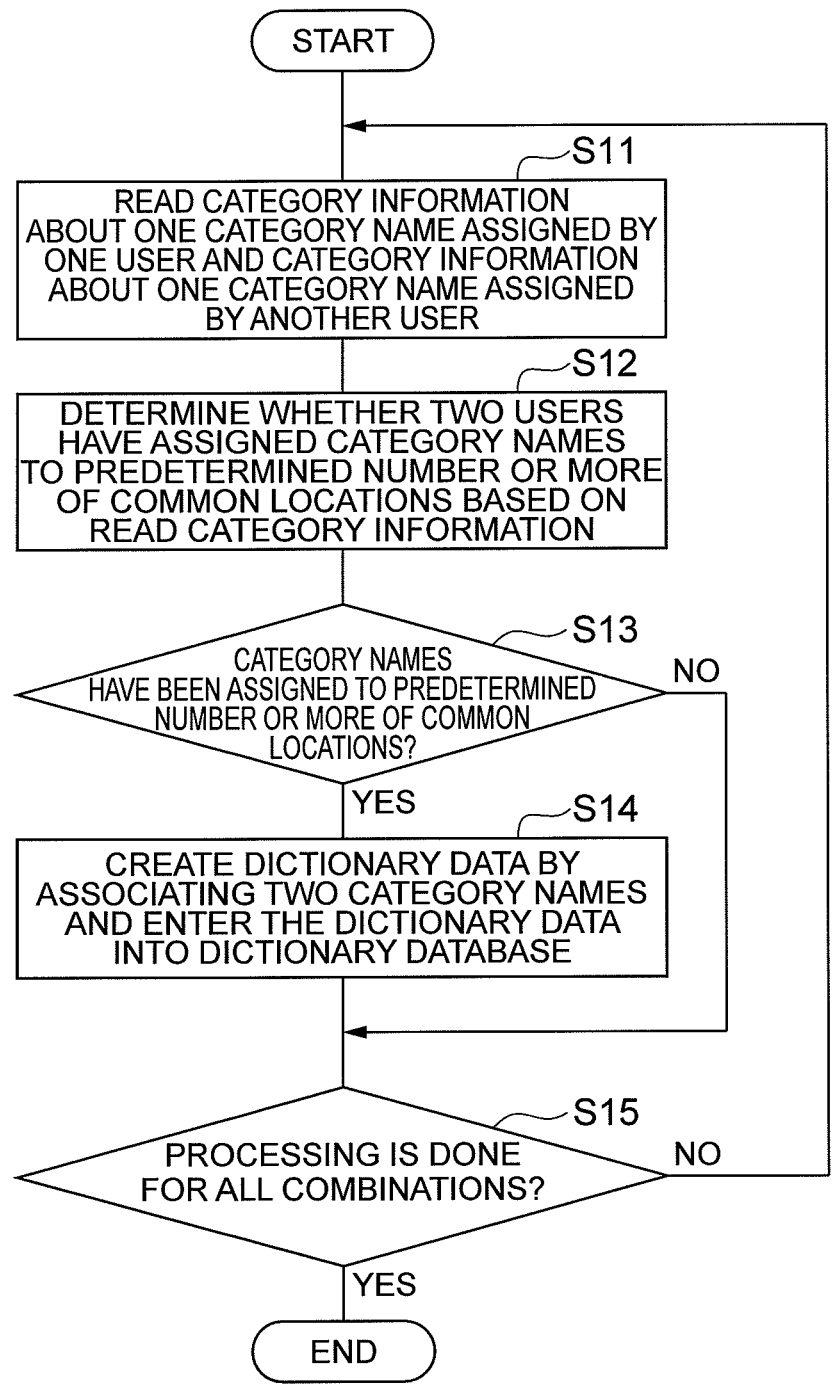
FIG. 11 is a flowchart showing a process of dictionary data creation in the search server shown in FIG. 1.

Registration of the dictionary data is performed as shown in FIG. 11. The dictionary registration unit 15 reads category information about one category name assigned by one user and category information about one category name assigned by another user from the category database 14 (Step S11, Determination step). Next, based on the read category information, the dictionary registration unit 15 determines whether the two users have assigned the category names to a predetermined number or more (threshold or more) of common locations (Step S12, Determination step). When the category names have been assigned to a predetermined number or more of common locations (Step S13; YES), the dictionary registration unit 15 creates dictionary data by establishing an association between the two read category names, and enters the dictionary data into the dictionary database 16 (Step S14, Registration step). The dictionary registration unit 15 executes the processing of the above Steps S11 to S14 for every combination of sets composed of a user and a category name (Step S15).

Figure 12:
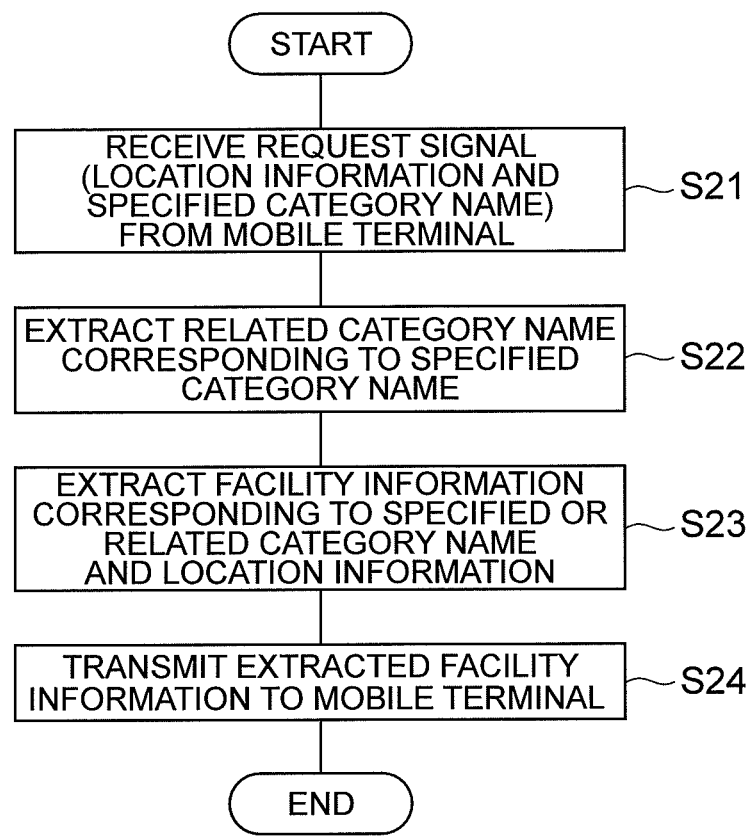
FIG. 12 is a flowchart showing a process of facility search in the search server shown in FIG. 1.

A process of searching for facility information using the dictionary data created in the above manner is performed as shown in FIG. 12. First, the request receiving unit 17 receives a request signal containing location information and a specified category name from the mobile terminal T (Step S21). Next, the search unit 18 extracts a related category name corresponding to the specified category name by referring to the dictionary database 16 (Step S22), and extracts facility information corresponding to the specified or related category name and the location information from the facility database 11 (Step S23). Then, the result transmitting unit 19 transmits the extracted facility information as search results to the mobile terminal T (Step S24). The screen De, Df is thereby displayed on the mobile terminal T.

Figure 13:
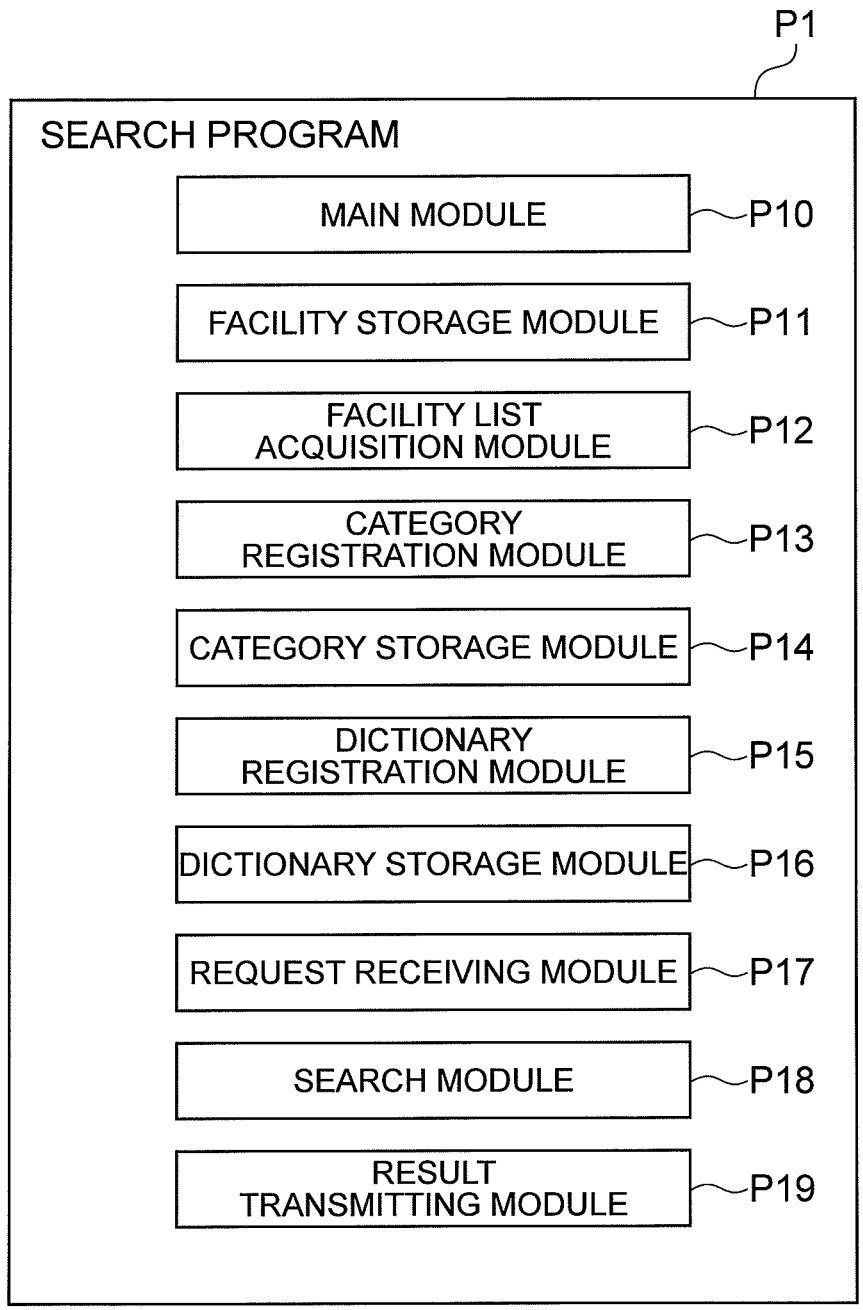
FIG. 13 is a view showing a search program according to the first embodiment.

Hereinafter, a search program (dictionary creation program) P1 for causing a computer to function as the search server 10 is described with reference to FIG. 13.

The search program P1 includes a main module P10, a facility storage module P11, a facility list acquisition module P12, a category registration module P13, a category storage module P14, a dictionary registration module P15, a dictionary storage module P16, a request receiving module P17, a search module P18, and a result transmitting module P19.

The main module P10 is a part that exercises control over the dictionary creation function and the search function. The functions implemented by executing the facility storage module P11, the facility list acquisition module P12, the category registration module P13, the category storage module P14, the dictionary registration module P15, the dictionary storage module P16, the request receiving module P17, the search module P18 and the result transmitting module P19 are equal to the functions of the facility database 11, the facility list acquisition unit 12, the category registration unit 13, the category database 14, the dictionary registration unit 15, the dictionary database 16, the request receiving unit 17, the search unit 18 and the result transmitting unit 19 described above, respectively.

The search program P1 is provided in the form of being stored in a tangible recording medium such as CD-ROM, DVD, ROM or semiconductor memory, for example. Further, the search program P1 may be provided through a communication network as a computer data signal superimposed onto a carrier wave.

As described above, according to the embodiment, it is determined whether two users have assigned category names to a predetermined number or more of common locations based on the category information. When the category names have been assigned to a predetermined number or more of common locations, the two category names assigned by the respective users to the common location are associated with each other, and entered as dictionary data. In this manner, by establishing an association between category names in consideration of the overlap of locations to which the category names are assigned, it is possible to create a related term dictionary with the user's thought or behavior (specifically, the act of classifying facilities located in the vicinity of a visiting destination by the own words) taken into consideration.

Further, according to the embodiment, not only a category name specified by a user's terminal but also another category name (related category name) associated with the category name are used when searching for facility information. Then, the facility information corresponding to the specified category name or the related category name is extracted and transmitted to the mobile terminal T. The user can thereby obtain not only information about facilities to which the category is assigned by the user but also facilities to which the category is assigned by others and which are likely to be related to the specified category. The user can thereby obtain information about facilities unknown to the user, thus enhancing the convenience of facility search.

Second Embodiment

A search server 10A according to a second embodiment is described hereinafter with reference to FIGS. 14 to 18. The second embodiment is different from the first embodiment in which facility information is provided in consideration of a connection (closeness) between users.

In this embodiment, at the time of assigning a category to a facility through the screens Da to Dc, a user can set privacy settings for the facility. Example of privacy settings include "everyone (public)", "friends only", "friends in company only", "circle members only" and the like, though the way of making privacy settings may be arbitrarily. Therefore, the input information transmitted from the mobile terminal T to the search server 10A contains information indicating privacy settings in addition to the user ID, the location information, the facility ID (or new facility information) and the category name.

Figure 14:
FIG. 14 is a view showing details of a facility display screen according to a second embodiment.

Accordingly, the layout of a screen Dg displaying the details of a facility is as shown in FIG. 14. The screen Dg is different from the screen Df in the first embodiment in that the mark indicating privacy settings of the facility information is displayed on the left of URL. The screen Dg shows that the facility information about a supermarket P is viewable only for users in a relationship of friends. In order to produce such display, the request signal transmitted from the mobile terminal T to the search server 10A contains the user ID corresponding to the terminal T in addition to the location information and the specified category name.

Figure 15:
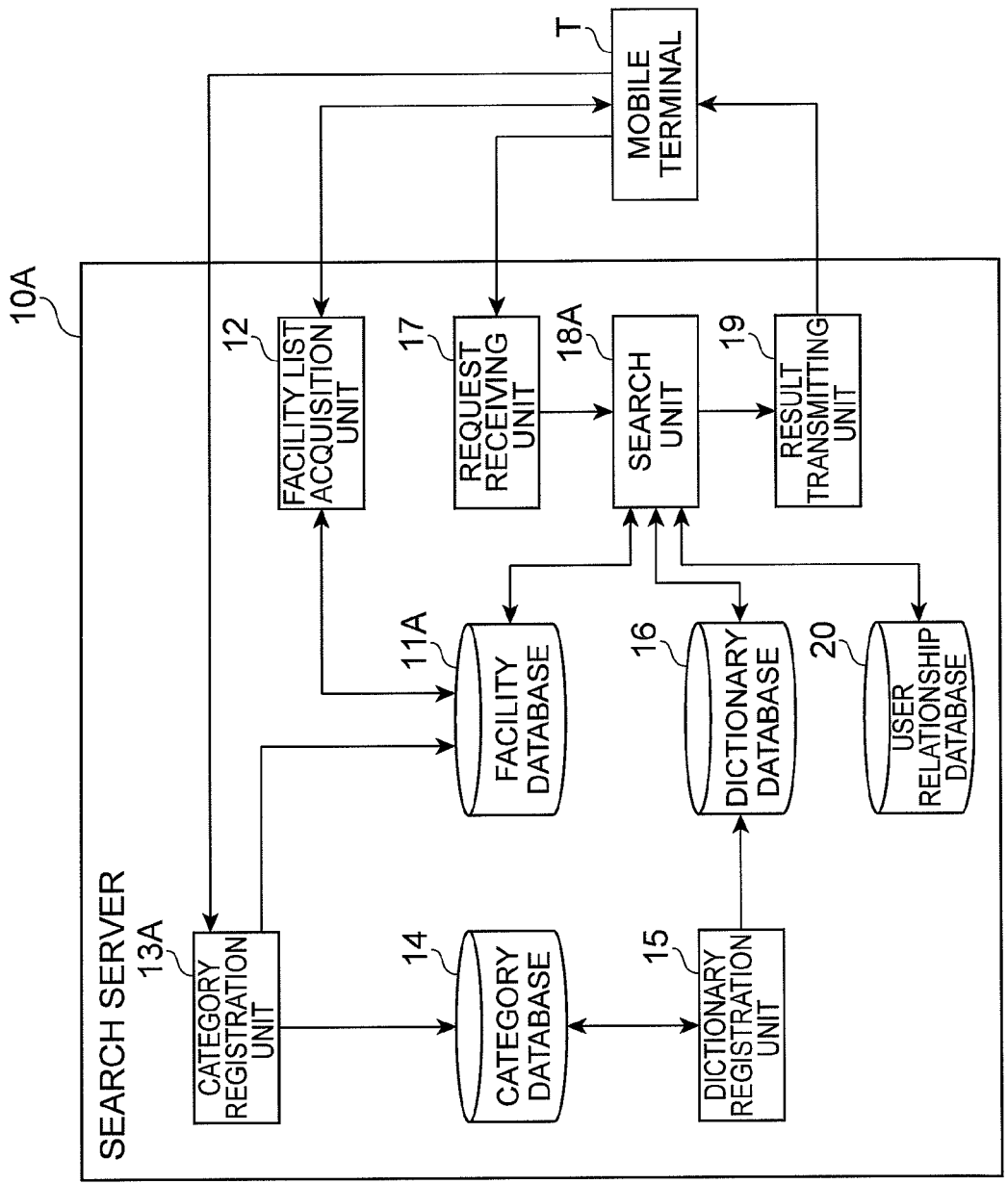
FIG. 15 is a block diagram showing a functional configuration of a search server according to the second embodiment.

As shown in FIG. 15, the search server 10A includes a facility database 11A, a category registration unit 13A and a search unit 18A in place of the facility database 11, the category registration unit 13 and the search unit 18, respectively. Further, the search server 10A includes a user relationship database (user relationship storage means) 20. Hereinafter, differences from the first embodiment are described, and the same part as the embodiment is not redundantly described.

The user relationship database 20 is means for storing user relationship information indicating a relationship between users. The user relationship information is generated in advance based on information about a friend relationship registered by a user on a given social networking service (SNS), and stored in the user relationship database 20. As shown in FIG. 16, the user relationship information contains two user IDs respectively uniquely identifying two users and information indicating a relationship between the users. Examples of a relationship between users include an ordinary friend relationship and various special friend relationships (close friends, like-minded colleagues, college companions etc.), though a relationship between users may be defined arbitrarily. A record about between users with no special relationship is not registered in the user relationship database 20.

The facility database 11A is a means for storing facility information composed of a facility ID, facility-related information, a category list, and a privacy settings list. The privacy settings list is a list of privacy settings information composed of the user ID of a user (registration user) who has assigned a category to a facility and privacy settings made at the time of assigning the category. Because there is a case where a plurality of users assign categories and privacy settings to one facility as in the first embodiment, one or more privacy settings information can be contained in the privacy settings list. FIG. 17 shows an example of facility information stored in the facility database 11A.

The category registration unit 13A is a means for receiving input information transmitted from the mobile terminal T and updating the facility database 11A and the category database 14 based on the input information. While the way of updating the category information is the same as that of the first embodiment, update of the facility information is performed in a different way from that of the first embodiment. The category registration unit 13A executes processing to add category names to the category list of the facility information identified by the received facility ID and add privacy settings information to the privacy settings list of the facility information on the facility database 11A. In the case where the category registration unit 13A receives new facility information (containing a category name and information indicating privacy settings) from the mobile terminal T, the category registration unit 13A assigns a new facility ID to the facility information and enters the facility information into the facility database 11A.

The search unit 18A is a means for extracting facility information corresponding to the location information and the category name contained in the request signal and also satisfying conditions specified in the privacy settings from the facility database 11A. First, the search unit 18A extracts another category name (related category name) associated with the specified category name from the dictionary database 16. Then, the search unit 18A reads facility information of facilities which contain the specified category name or the related category name and located within a predetermined range from the location indicated by the input location information from the facility database 11A. The processing up to here is the same as the processing of the search unit 18 in the first embodiment.

Then, the search unit 18A determines, for each of the read facility information, whether or not to transmit the information as search results to the mobile terminal T. Specifically, the search unit 18A determines the facility information with the category list containing the specified category name as information to be transmitted. This is because a user (request user) of the mobile terminal T from which the request signal is transmitted has assigned the category to the facility information. On the other hand, for the facility information with the category list containing the related category name only, i.e. the facility information to which the category has been assigned only by a user (another user) different from the request user, the search unit 18A performs the following processing.

When the privacy settings information in the privacy settings list of the facility information is all "everyone", because no restrictions of privacy settings are imposed for the facility information, the search unit 18A determines to transmit the facility information. On the other hand, when the privacy settings information imposing restrictions ("friends only" etc.) is contained in the privacy settings list of the facility information, the search unit 18A refers to the user relationship database 20 and determines whether user relationship information indicating the combination of a request user ID and another user ID and privacy settings indicated by its privacy settings information exists or not. When at least one such user relationship information exists, the search unit 18A determines the facility information as information to be transmitted, and when not, determines the facility information as information not to be transmitted. This means that, as long as the request user is allowed to view the facility information by at least one of the other users, the facility information is to be transmitted.

By the above processing, the search unit 18A extracts the facility information to be provided to the request user and outputs the information as search results to the result transmitting unit 19.

Figure 18:
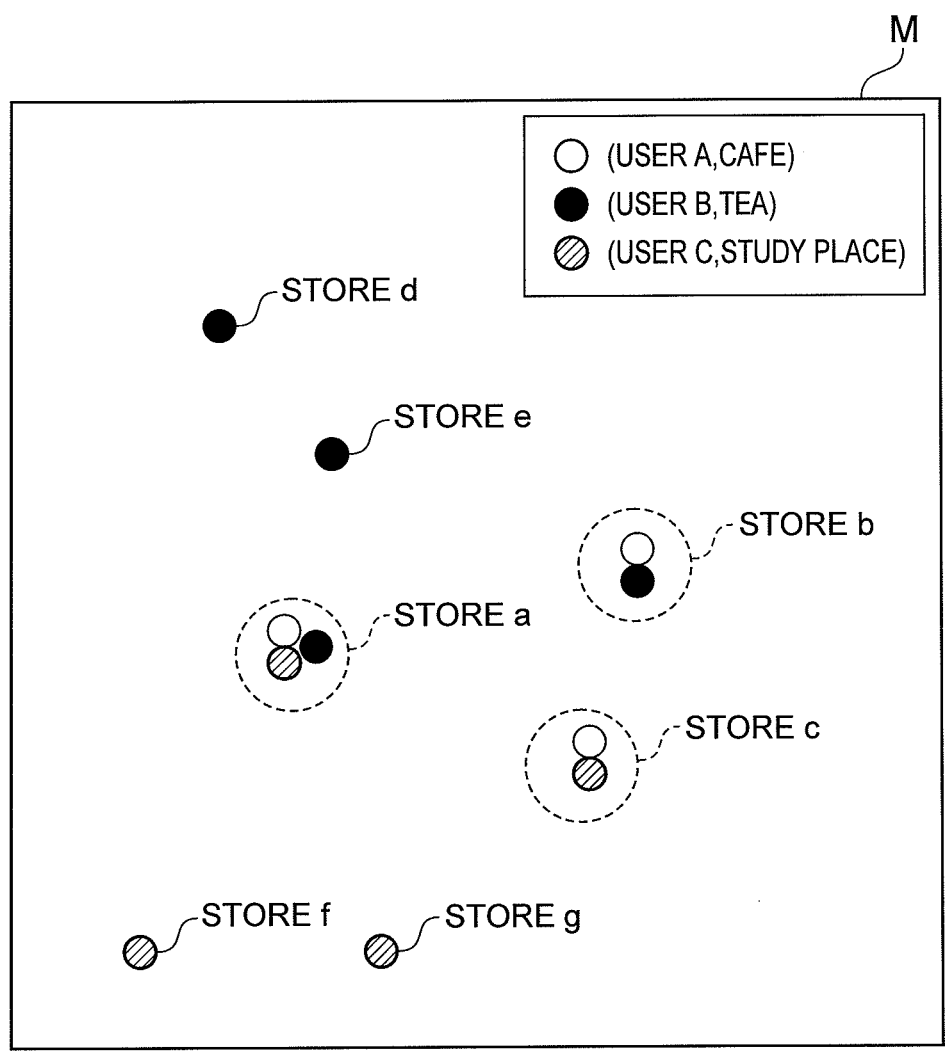
FIG. 18 is a view to explain a facility search method according to the second embodiment.

A specific example of the search unit 18A is described hereinafter with reference to FIGS. 10, 16 to 18. FIG. 18 is a view showing only the facilities corresponding to the facility information of FIG. 17 among the facilities shown in FIG. 9.

When a user A searches for "cafe" in the map M, the search unit 18A extracts not only the three stores (stores a to c) to which "cafe" is assigned but also the four stores (stores d to g) to which "cafe" is not assigned but the related category name "tea" or "study place" is assigned.

Because the specified category name "cafe" is assigned to the stores a to c by the user A, the search unit 18A determines the three stores as information to be transmitted. Because only "everyone" is set in the privacy settings list of the store d, the search unit 18A also determines the store d as information to be transmitted. Because the privacy settings "friends only" is set for the store e by the user B and the users A and B are set as friends with each other, the search unit 18A also determines the store e as information to be transmitted. On the other hand, the privacy settings "like-minded colleagues" is set for the stores f and g by the user C and the users A and C are not set as "like-minded colleagues", the search unit 18A determines the stores f and g as information not to be transmitted. Accordingly, the search unit 18A outputs the facility information of the stores a to e only to the result transmitting unit 19.

In this embodiment, because information about a registration user is contained in the facility information, the search unit 18A may output search results as follows. First, the search unit 18A may compare information about the registration user with user relationship information and set the order of display on the screen De to each of the extracted facility information. For example, the search unit 18A may set the order of display so that the facility information whose registration user is a person having a given relationship with a request user on the user relationship information is displayed prior to the facility information for which no restrictions are imposed by privacy settings.

Further, the search unit 18A may extract only the facility information whose registration user is a person having a given relationship with a request user on the user relationship information. In this case, the request signal further contains user range information indicating a search range based on a user relationship (e.g. user range information indicating "searching facilities registered by friends"). The search unit 18A compares the user range information, the user relationship information and the facility information extracted as above, and outputs only the facility information located within the search range indicated by the user range information as search results.

Figure 19:
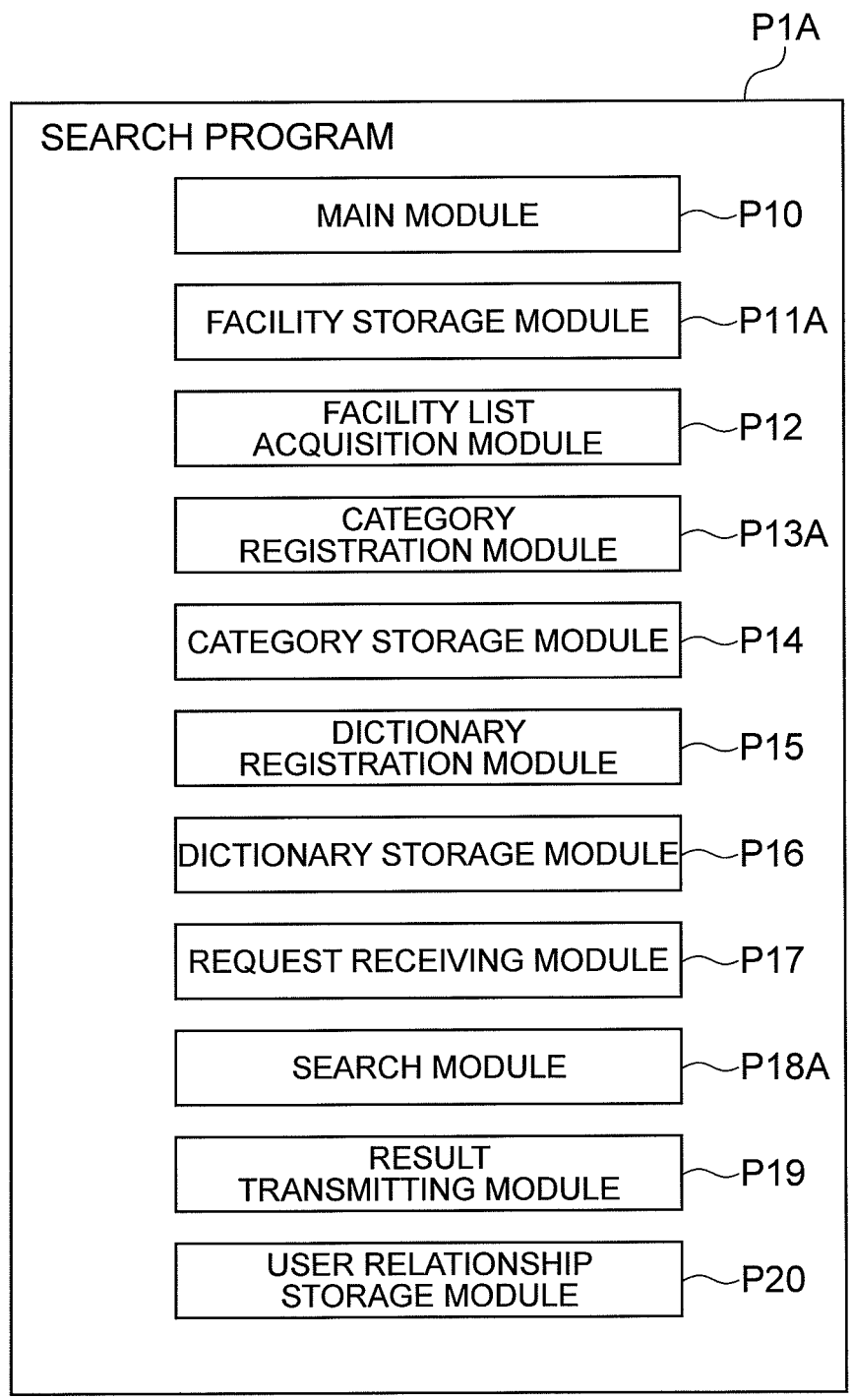
FIG. 19 is a view showing a search program according to the second embodiment.

A structure of a search program NA causing a computer to function as the search server 10A is as shown in FIG. 19. The search program HA includes a facility storage module P11A, a category registration module P13A and a search module P18A in place of the facility storage module P11, the category registration module P13 and the search module P18, respectively. Further, the search program NA includes a user relationship storage module P20. The functions implemented by executing the facility storage module P11A, the category registration module P13A, the search module P18A and the user relationship storage module P20 are equal to the functions of the facility database 11A, the category registration unit 13A, the search unit 18A and the user relationship database 20, respectively.

As described above, the same advantages as those of the first embodiment can be obtained in this embodiment. Further, in this embodiment, the facility information is extracted in consideration not only of matching with the category name but also of the availability of the information based on a relationship between users. It is thereby possible to provide search results reflecting a connection (closeness) between users to the user.

Hereinbefore, the present invention has been described in detail with respect to embodiments thereof. However, the present invention is not limited to the above-described embodiments. Various changes and modifications may be made therein without departing from the scope of the invention.

Although the dictionary registration unit 15 creates the dictionary related to category names in each of the above-described embodiments, words to be added to the dictionary data are not limited thereto. Further, the purpose of use of the created dictionary is also not limited to facility search, and the present invention is also applicable to creation of a dictionary to be used for searching for other kinds of information.

The structure of each data and database is also not limited to those described above. For example, the facility information shown in FIG. 17 may be further normalized and divided into a plurality of tables. Although the search server 10, 10A includes the databases in each of the above-described embodiments, a server different from the search server may include databases, and the search server may acquire information by accessing the databases through a communication network. For example, the search server may acquire user relationship information from a user relationship database installed in a given SNS server, without including a database equivalent to the user relationship database 20. Further, the search server may acquire facility information from a facility database installed in a given facility management server, without including a database equivalent to the facility database 11, 11A.

Although the location information contained in the category information is represented in the form of latitude and longitude in each of the above-described embodiments, the form of representing the location information is not limited thereto. For example, the location information may be represented in a form other than latitude and longitude (e.g. location address etc.).

Further, the location information may be represented in a three-dimensional manner by latitude and longitude and altitude. In this case, the category information containing the location information as represented by (x11, y11, z11), for example, is accumulated in the category database 14. Further, in this case, the geographical range which is regarded as a common location by the dictionary registration unit 15 is also represented in a three-dimensional form. For example, the dictionary registration unit 15 assumes a range indicated by a virtual cylinder with a radius of several tens of meters and a height of several meters to be the geographical range regarded as a common location. Use of the location information represented three-dimensionally enables appropriate determination of the overlap of locations to which words are assigned by taking not only a two-dimensional range but also a height into consideration. For example, it is possible to create more detailed dictionary data by distinguishing between category information corresponding to different floors in the same building.

REFERENCE SIGNS LIST 10, 10A . . . Search server, 11, 11A . . . Facility database, 12 . . . Facility list acquisition unit, 13, 13A . . . Category registration unit, 14 . . . Category database, 15 . . . Dictionary registration unit, 16 . . . Dictionary database, 17 . . . Request receiving unit, 18, 18A . . . Search unit, 19 . . . Result transmitting unit, 20 . . . User relationship database, P1, P1A . . . Search program, P10 . . . Main module P11, P11A . . . Facility storage module, P12 . . . Facility list acquisition module, P13, P13A . . . Category registration module, P14 . . . Category storage module, P15 . . . Dictionary registration module, P16 . . . Dictionary storage module, P17 . . . Request receiving module, P18, P18A . . . Search module, P19 . . . Result transmitting module, P20 . . . User relationship storage module, T . . . Mobile terminal

The invention claimed is:

1. A server comprising:
an input storage unit for storing input information containing location information indicating a geographical location, a word assigned to the location, and a user ID identifying a user having assigned the word to the location, the location information, the word, and the user ID being in association with one another;
a determination unit for reading out first input information indicating first locations to which a first word is assigned by a first user and second input information indicating second locations to which a second word is assigned by a second user from the input storage unit, the first word being different from the second word and the first user being different from the second user, and determining whether a number of common locations overlapping between the first and second locations is equal to or greater than a first preset threshold based on the first and second input information; and
a registration unit for creating dictionary data containing the first and second words in association with each other and entering the dictionary data into a dictionary storage unit when the determination unit determines that the number of common locations overlapping between the first and second locations is equal to or greater than the first preset threshold.

2. The server according to claim 1, wherein, when the dictionary data containing the first word and the second word in association with each other are stored in the dictionary storage unit and further the determination unit determines, based on the second input information and third input information indicating third locations to which a third word is assigned by a third user, that a number of common locations overlapping between the second and third locations is equal to or greater than a second preset threshold, the registration unit creates dictionary data containing the first to third words in association with one another and enters the dictionary data into the dictionary storage unit.

3. The server according to claim 1, wherein, when the dictionary data containing the first word and the second word in association with each other is stored in the dictionary storage unit and further the determination unit determines, based on the second input information and third input information indicating third locations to which a third word is assigned by a third user, that a number of common locations overlapping between the second and third locations is equal to or greater than a second preset threshold, the registration unit creates dictionary data containing the second and third words in association with each other without associating the first and third words each other, and enters the dictionary data into the dictionary storage unit.

4. The server according to claim 1, wherein
the location information is information representing the geographical location by at least latitude and longitude, and
when a location indicated by one of the input information and a location indicated by another one of the input information are within a predetermined geographical range, the determination unit determines the both locations to be common.

5. The server according to claim 4, wherein
the location information is information representing the geographical location by the latitude and longitude, and an altitude, and
the predetermined geographical range is a range represented in a three-dimensional form.

6. The server according to claim 1, further comprising:
a receiving unit for receiving a request signal containing a specified category name input by a user from a terminal of the user;
a search unit for reading facility information corresponding to the request signal received by the receiving unit from a facility storage unit for storing facility information containing a facility ID identifying a facility and a category name assigned to the facility by a user in association with each other; and
a transmitting unit for transmitting the facility information read by the search unit to the terminal, wherein
the word is a category name assigned to a facility located in a predetermined location, and
the search unit reads another category name associated with the specified category name from the dictionary storage unit, and reads facility information corresponding to the specified category name or said another category name from the facility storage unit.

7. The server according to claim 6, wherein
the facility information further contains information indicating privacy settings of the facility information based on a relationship between users assigned by a user, the receiving unit receives the request signal further containing a user ID identifying a user of the terminal, and the search unit reads facility information corresponding to the specified category name or said another category name and in which the user identified by the user ID contained in the request signal is within boundaries of the privacy settings by reference to the facility storage unit and a user relationship storage unit for storing user relationship information indicating the relationship between users.

8. The server according to claim 6, wherein, when the search unit reads facility information containing said another category name and not containing the specified category name, the search unit temporarily associates the specified category name with the facility information for processing in the terminal.

9. A dictionary creation method to be executed by a server, comprising:

a determination step of reading out first input information indicating first locations to which a first word is assigned by a first user and second input information indicating second locations to which a second word is assigned by a second user from an input storage unit for storing input information containing location information indicating a geographical location, the first word being different from the second word and the first user being different from the second user, a word assigned to the location, and a user ID identifying a user having assigned the word to the location, and determining whether a number of common locations overlapping between the first and second locations is equal to or greater than a preset threshold based on the first and second input information, the location information, the word, and the user ID being in association with one another; and a registration step of creating dictionary data containing the first and second words in association with each other and entering the dictionary data into a dictionary storage unit when it is determined that the number of common locations overlapping between the first and second locations is equal to or greater than the preset threshold.

10. A non-transitory computer-readable recording medium recording a dictionary creation program causing a computer to function as:

an input storage unit for storing input information containing location information indicating a geographical location, a word assigned to the location, and a user ID identifying a user having assigned the word to the location, the location information, the word, and the user ID being in association with one another;

a determination unit for reading out first input information indicating first locations to which a first word is assigned by a first user and second input information indicating second locations to which a second word is assigned by a second user from the input storage unit, the first word being different from the second word and the first user being different from the second user, and determining whether a number of common locations overlapping between the first and second locations is equal to or greater than a preset threshold based on the first and second input information; and a registration unit for creating dictionary data containing the first and second words in association with each other and entering the dictionary data into a dictionary storage unit when the determination unit determines that the number of common locations overlapping between the first and second locations is equal to or greater than the preset threshold.

* * * * *